United States Patent [19]

Heard et al.

[11] Patent Number: 5,083,204
[45] Date of Patent: Jan. 21, 1992

[54] SIGNAL PROCESSOR FOR AN IMAGING SENSOR SYSTEM

[75] Inventors: James L. Heard, Torrance; Ted W. Berwin, Playa del Rey; Roland L. Andrews, Altadena; Larry A. Scanlan, Los Angeles, all of Calif.

[73] Assignee: Hughes Aircraft Company, El Segundo, Calif.

[21] Appl. No.: 656,382

[22] Filed: Oct. 1, 1984

[51] Int. Cl.$^5$ .................. H04N 5/33; H01L 25/00
[52] U.S. Cl. ........................ 358/113; 250/332; 340/744; 358/166
[58] Field of Search ............ 358/113, 166; 250/332; 340/744

[56] References Cited

U.S. PATENT DOCUMENTS

| | | |
|---|---|---|
| 3,947,826 | 3/1976 | Bockwoldt . |
| 3,979,555 | 9/1976 | Opittek et al. . |
| 3,983,320 | 9/1976 | Ketcham et al. . |
| 4,215,414 | 7/1980 | Huelsman . |
| 4,298,887 | 11/1981 | Rode .................................. 358/113 |
| 4,345,148 | 8/1982 | Pines et al. ........................ 250/578 |
| 4,353,092 | 10/1982 | Bailey et al. ...................... 358/166 |
| 4,365,304 | 12/1982 | Ruhman et al. ................... 358/166 |
| 4,445,138 | 4/1984 | Zwirn et al. ...................... 358/166 |
| 4,450,482 | 5/1984 | Ackermann ....................... 358/166 |

OTHER PUBLICATIONS

H. E. Rauch et al., SPIE, vol. 226, Infrared Imaging Systems Tech., 1980, p. 53.
"Reference-Free Nonuniformity Compensation for IR Imaging Arrays", P. M. Narendra, Honeywell Systems & Research Center, SPIE vol. 252 Smart Sensors II (1980).

Primary Examiner—Stephen C. Buczinski

[57] ABSTRACT

A signal processor for use with an imaging sensor system that provides enhanced video imagery. The signal processor may be coupled to a FLIR system, for example, which comprises a plurality of detectors that are scanned across an image scene and reference temperature source during separate portions of each scan cycle. The signal processor comprises an input processor coupled to the imaging sensor system which processes analog signals derived from each of the plurality of detectors. The input processor normalizes the analog signals relative to one another during the active portion of the scan cycle based upon stored data derived from a predetermined sensor responsivity calibration procedure. This normalization function equalizes the gains associated with all channels of the sensor system. The input processor also restores the DC levels of each of the sensor channels to respective DC values related to the reference temperature source during the inactive portion of the scan cycle. This function is performed during the calibration procedure and while the system is in operation. The input processor digitizes the signals which are applied to a scan converter. The scan converter stores the digitized signals and converts the stored signals into signals which are compatible with a video monitor employed to view the image. An output processor is coupled to the scan converter that is employed to process signals in a manner which permits software-controlled digitized image enhancement thereof, and which converts the enhanced signals into analog video output signals compatible with the video monitor.

11 Claims, 4 Drawing Sheets

SIGNAL PROCESSOR FOR AN IMAGING SENSOR SYSTEM

BACKGROUND OF THE INVENTION

The present invention relates generally to signal processors for use in processing video data, and the like, and more particularly to signal processors for use with multi-sensor imaging systems, such as forward looking infrared imaging systems, and the like, which provide electronically enhanced video images displayed on a video monitor.

Conventional forward looking infrared (FLIR) sensor systems, and the like, are employed as night vision systems on aircraft, tanks, ships and other military vehicles. The conventional FLIR system for example, comprises a sensor system, a signal processor and a video display. The sensor comprises a large number of detectors whose signal outputs are multiplexed and applied to the signal processor. The signal processor electronically demultiplexes, enhances and converts the sensor signals into video signals compatible with the video display, and applies the enhanced video signals to the display for viewing by the vehicle operator.

Although all FLIR systems incorporate signal processors, the sophistication and image enhancement capabilities vary widely from system to system. For example, prior art systems have typically incorporated responsivity equalization circuitry, automatic gain control circuitry and video compacting circuitry. However, these prior art systems have employed analog circuits to accomplish the gain control and video compacting functions, and have incorporated manually operated potentiometers to implement the responsivity equalization function. The use of manually-calibrated, analog systems in prior art FLIR signal processors, and the like, has resulted in less than optimum performance from these systems.

Although relating generally to staring focal plane detector arrays, a publication entitled "Reference-free nonuniformity compensation for IR imaging arrays," SPIE, vol. 252, Smart Sensors II, 1980, pp, 10–17 discusses some conventional infrared signal processing problems and describes a reference-free compensation scheme to accomplish automatic responsivity equalization. The compensation scheme described in this paper utilizes scene statistics to develop signals suitable for implementing temperature compensation.

SUMMARY OF THE INVENTION

In order to overcome the limitations of prior art signal processing systems, the present invention provides for a signal processor which may be employed with an imaging sensor system, such as a forward looking infrared (FLIR) system, or the like. The FLIR system, for example, comprises a plurality of sensors, or detectors, which are scanned across an image scene during a first portion of a scan cycle (the active portion), and scanned across an internal reference temperature source during a second portion of the scan cycle (the inactive or retrace portion). The signal processor of the present invention provides enhanced video output signals to a video display or monitor which are representative of the image scene.

The signal processor comprises an input processor coupled to the imaging sensor system which processes analog signals derived from each of the plurality of detectors. The input processor is adapted to normalize the analog signals relative to one another during the active portion of the scan cycle based upon stored data derived from a predetermined sensor responsivity calibration procedure. This normalization function equalizes the gains associated with all the channels of the sensor system. The input processor also processes the analog signals in order to restore the DC levels of each of the sensor channels to respective DC values related to the reference temperature source during the inactive portion of the scan cycle. This DC restoration function is performed during the calibration procedure and while the system is in operation. The input processor processes the normalized and DC restored signals to provide digitized first output signals therefrom.

The signal processor also comprises a scan converter coupled to the input processor which stores the digitized first output signals in memory and processes the stored digitized signals to provide second digitized output signals which are compatible with the video monitor. The scan converter functions as a demultiplexer and interpolator for the signal processor. An output processor is coupled to the scan converter which is employed to process the second digitized output signals in a manner which permits software-controlled digitized image enhancement thereof, and which converts the enhanced second digitized output signals into analog video output signals compatible with the video monitor.

During operation, the FLIR system incorporating the signal processor of the present invention is first calibrated. The FLIR system may comprise one hundred and sixty (160) detector elements, for example, whose outputs are multiplexed prior to their application to the signal processor. The detectors are typically oriented vertically and scanned horizontally across an image scene. During the calibration procedure, the detectors are scanned across a uniform black body temperature source. Each of the detector elements has a different responsivity (gain) factor, and each has different DC level errors during each scan cycle. The sensors are scanned across the uniform temperature source during the active portion of the scan cycle, and then during a retrace portion of the cycle, scanned across a internal reference temperature source. The calibration procedure is performed for approximately 30 to 40 scan cycles.

Gain correction constants for all detector channels are calculated automatically during the calibration procedure. The gain correction constants are fixed for each detector and do not change during normal operation. The gain correction constants are stored in a nonvolatile memory in the input processor and are recovered at system power-up. The DC error correction factors are computed during each scan cycle and applied to the sensor signals currently being processed. A microprocessor, or the like, is employed to compute and control the signal processing in the input processor.

The gain and DC level-corrected signals are then digitized and stored in scan converter memory. The scan converter includes an interpolation section which converts the digital data associated with each scan cycle into a field of data compatible with the video monitor. For example, the sensor system may have 160 lines of video, due to the fact that it has 160 vertically-aligned detectors, which must be converted into 480 line video processed by the video monitor.

The output processor includes a look-up table which is stored in nonvolatile memory. The look-up table comprises a stored transfer curve which implements image enhancement functions. The look-up table is generated utilizing statistics derived from a histogram and a histogram equalization algorithm implemented in the microprocessor. A software control program implemented in the microprocessor performs image enhancement functions that improve the image on the video monitor. Such functions as automatic level control, automatic gain control, video compacting, image inversion and gamma correction may be implemented. The output processor also includes aperture correction circuitry which is adapted to enhance the horizontal modulation transfer function (MTF) of the system in order to improve the system frequency response.

The software-controlled digital image enhancement features of the present invention may be implemented using a relatively small amount of standard integrated circuits. The system provides for adaptive calibration, in that gains of all sensor channels are equalized during the calibration procedure and the calibration factors are stored indefinitely for use by the system. The temperature of the reference temperature source need not be known for the system to operate properly. The DC levels of all detectors in the system are restored automatically to the DC reference temperature defined by the reference temperature source. There are no manual adjustments to be made during calibration or operation.

Image enhancement functions are provided in a look-up table instead of being calculated by means of analog circuits as in conventional signal processors. A wide dynamic range is achieved using digital image-processing circuitry and techniques. Increased system frequency response is achieved by means of the aperture correction circuitry. Flexibility and growth of the system is possible and may be implemented by means of changes to software programs.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DESCRIPTION OF THE PREFERRED EMBODIMENT

Figure 1:
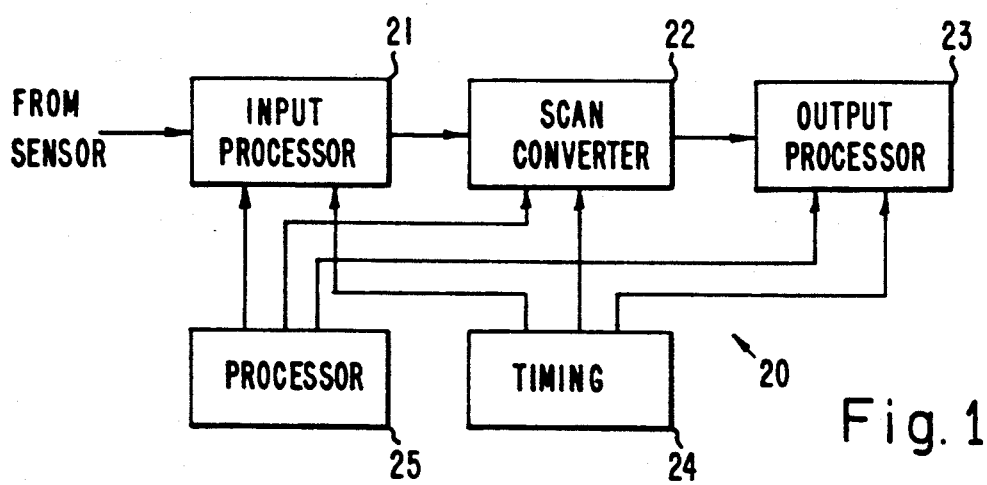
FIG. 1 shows a block diagram of a signal processor in accordance with the principles of the present invention.

Referring to FIG. 1, a block diagram of a signal processor 20 in accordance with the principles of the present invention is shown. The signal processor 20 is adapted to receive analog input signals derived from a video signal source, and apply the processed signals to a video monitor. The signal processor 20 will be described with reference to its use in conjunction with a forward looking infrared (FLIR) system. It is to be understood, however, that other imaging sensors, such as synthetic aperture radar systems or standard video sensors may also utilize the signal processor 20, and that the scope of the present invention is not limited to FLIR systems.

The signal processor 20 comprises an input processor 21 which has inputs that are adapted to receive analog input signals derived from the FLIR sensor. The input processor 21 performs automatic responsivity equalization and DC restoration functions and converts analog signals into digital signals compatible with a digital scan converter 22 coupled to its output.

The digital scan converter 22 is adapted to demultiplex the applied signals and convert them into signals compatible with the video monitor. The scan converter 22 converts image data derived from a vertical detector array which is scanned horizontally into data compatible with standard TV format, which is a horizontal array scanned vertically. The scan converter 22 thus performs an orthogonal rotation of the image data timing and hence operates to reformat the image scene data.

The scan converter 22 has an output which is coupled to an output processor 23. The output processor 23 is employed to process the reformatted data in a manner which permits software-controlled digitized image enhancement thereof. In addition, the output processor 23 converts these enhanced reformatted signals into analog video output signals compatible with the video monitor.

Timing circuitry 24 is employed to control the clocking of signals through the signal processor 20 and to synchronize the throughput of data from the FLIR signal source to the video monitor. A computer processor, such as a microprocesor 25, or the like, is coupled to the components of the signal processor 20 in order control the data processing functions thereof. The microprocessor 25 controls processing of the analog input data to implement the gain equalization function in the input processor 21, and controls the computation of algorithms which generate the histogram and look-up table transfer function in the output processor 23. A more detailed understanding of the function of the microprocessor 25 will be obtained with reference to the detailed figures discussed hereinbelow.

Figure 2:
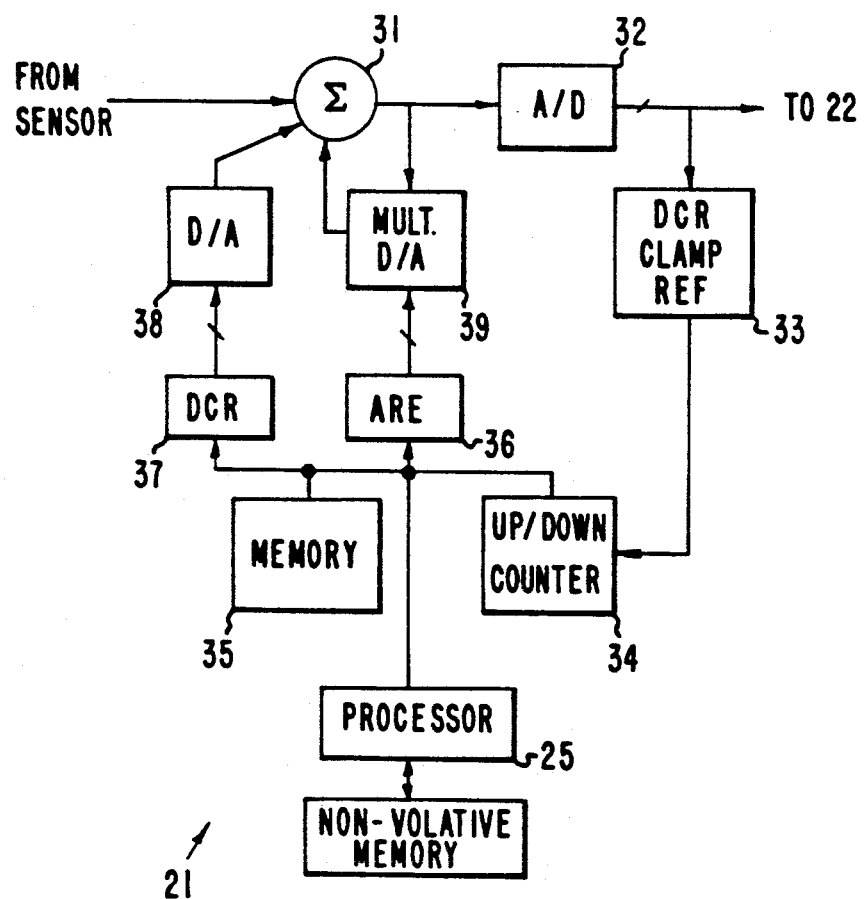
FIG. 2 shows a block diagram of an embodiment of an input processor for use with the signal processor of FIG. 1.

Referring to FIG. 2, a detailed block diagram of one embodiment of the input processor 21 is shown. This portion of the signal processor 20 comprises a summing circuit 31 which receives as inputs, the analog input signals from the FLIR signal source, and analog signals representative of the automatic responsivity equalization (ARE) correction constants and DC restoration (DCR) correction factors. The signal output of the summing circuit 31 is processed by a first A to D converter 32 and then applied to the scan converter 22.

Automatic responsivity equalization and DC restoration concepts are generally well known in the signal processing art. Exemplary of automatic responsivity control circuitry is U.S. Pat. No. 4,345,148 entitled "Automatic resonsivity control for a CCD imager," assigned to the assignee of the present invention. Accordingly, a detailed discussion of these concepts will be dispensed with.

The automatic responsivity equalization (ARE) and DC restoration (DCR) factors are generated by the following circuitry. A clamping voltage reference is generated by a DCR clamp reference circuit 33 which is coupled to the output of the D to A converter 32. The DCR clamp reference circuit is coupled to an up/down counter 34, whose output is adapted to increment or decrement DC restoration factors. The microprocessor 25 is coupled to a RAM memory 35, a non-volatile memory 39, and automatic responsivity equalization and DC restoration register circuits 36, 37, respectively. The DC restoration circuit 37 is coupled through a first D to A converter 38 to the summing circuit 31 while the automatic responsivity equalization circuit 36 is coupled through a multiplying D to A converter 39 to the summing circuit 31.

The scan converter 22 of FIG. 1 is not shown in detail in any figure. Digital scan converters are well known in the art, and the construction of this component of the signal prcessor 20 will not be discussed in detail herein. However, a representative sample of a scan converter which could be adapted for use with the present invention is described in U.S. Pat. No. 3,947,826, entitled "Scan Converter," and issued to the assignee of the present invention.

The interpolation section of the scan converter 22 comprises an algorithm implemented in hardware which converts, for example, FLIR scan line format (160 lines per field) to TV video scan line format (240 lines per field). The particular implementation practiced in the present invention involves mapping of four successive IR scan lines into six TV scan lines in a predetermined combinational manner. The particular algorithm maps four IR scan lines (A, B, C and D) into six TV scan lines (A, ½A+½B, B, C, ½C+½D, D).

Figure 3:
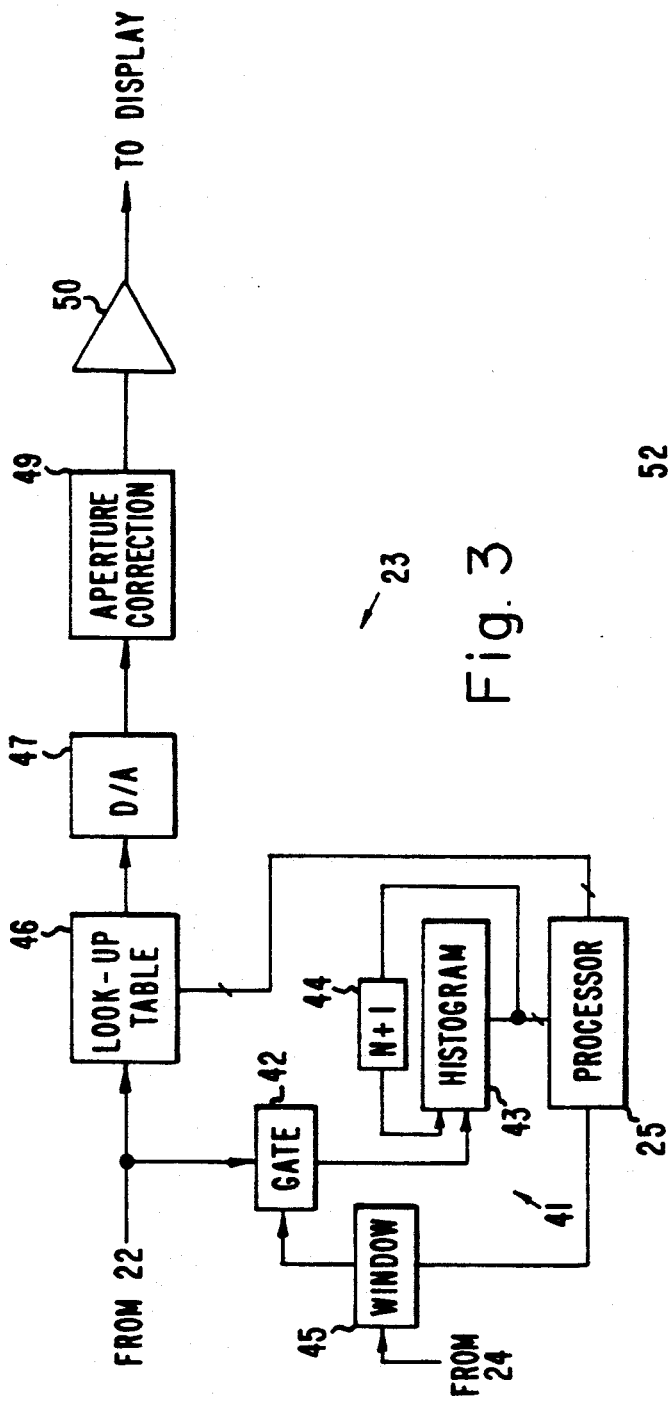
FIG. 3 shows a block diagram of an embodiment of an output processor for use with the signal processor of FIG. 1.

Referring to FIG. 3, a block diagram of an embodiment of an output processor 23 for use in the signal processor 20 of FIG. 1 is shown. The output processor 23 comprises histogram generation circuitry 41 which includes window circuitry 45, a gate circuit 42, a histogram circuit 43 and in incremental counter 44. The histogram generation circuitry 41 is adapted to process digitized output signals received from the scan converter 22 and generate a histogram of the number of occurances of signals at each infrared detector intensity level during each field time. The microprocessor 25 is coupled to the histogram generation circuitry 41 for accessing the histogram data.

Histogram equalization is generally well known in the signal processing art and hence will not be discussed in detail herein. Representative of histogram equalization techniques known in the art are described in U.S. Pat. No. 3,979,555 entitled "Histogram equalization system for display improvement," and U.S. Pat. No. 3,983,320 entitled "Raster display histogram equalization," both of which are assigned to the assignee of the present invention.

The microprocessor 25 utilizes the histogram data to generate a look-up table 46 that is physically stored in RAM memory. The histogram data is employed to convert the digitized reformatted unenhanced signals received from the scan converter 22 into enhanced image data under control of the microprocessor 25. The look-up table 46 comprises data which allows the microprocessor 25 to perform several image enhancement functions including automatic level correction, automatic gain control, polarity reversal and gamma correction.

The output processor 23 also comprises a D to A converter 47 which accepts inputs from the look-up table 46. The output of the D to A converter 47 comprises video signals which are compatible with the intensity levels of the monitor. The output of the D to A converter is coupled through aperture correction circuitry 49 to an output amplifier 50 whose output is coupled to the video monitor.

Figure 4:
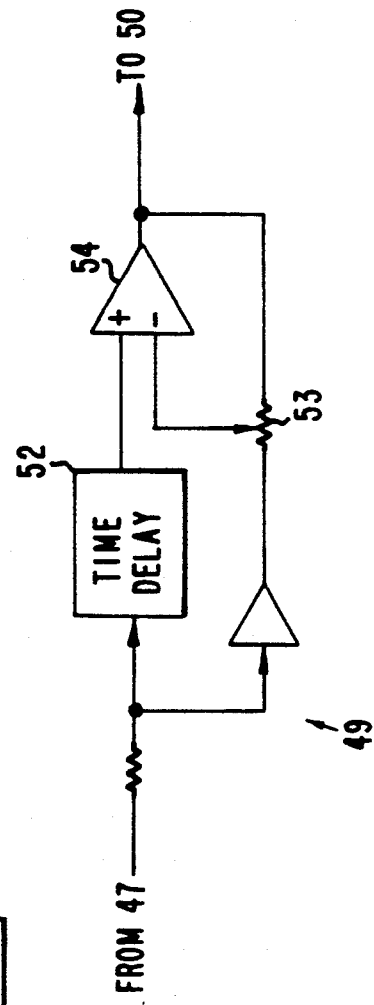
FIG. 4 shows a block diagram of an embodiment of a aperture correction circuit for use with the output processor of FIG. 3.

FIG. 4 shows an embodiment of the aperture correction circuitry 49 for use in the output processor 23 The aperture correction circuitry 49 is adapted to boost the frequency response of the system and hence improve the modulation transfer function (MTF) of the system. The circuitry 49 utilizes a time delay circuit 52 and a variable resistor network 53 which feeds signals to a summing circuit 54. This circuit operates as a cosine filter. The operation of combining time-delayed signals with currently processed signals boosts the gain above certain frequencies and improves the system frequency response.

Figure 5:
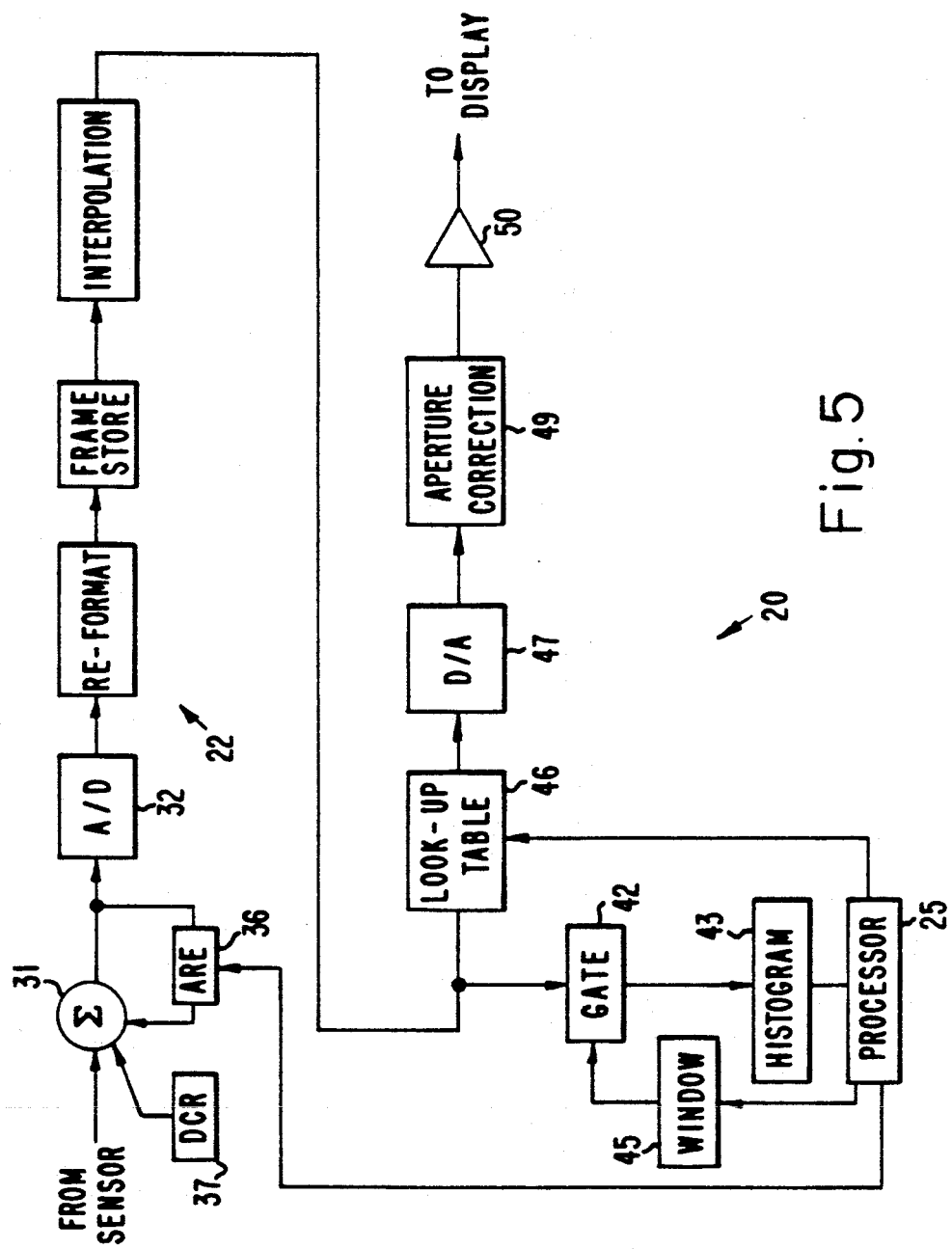
FIG. 5 shows a functional block diagram of the signal processor of FIG. 1.
Figure 6:
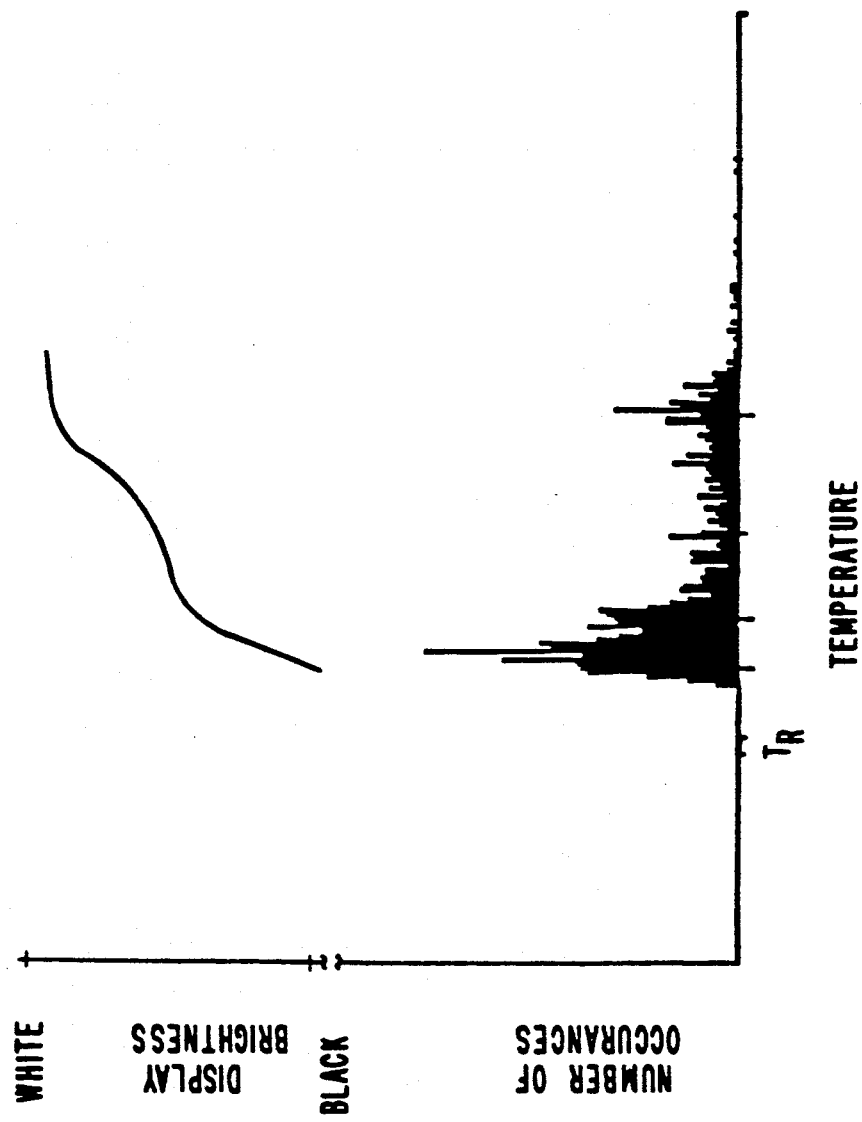
FIG. 6 shows a graph of a typical histogram overlayed with a representative transfer curve implemented by the output processor of the present invention.

The operation of the signal processor 20 of the present invention will be explained with reference to FIG. 5, which shows a functional block diagram of the signal processor 20. The system will be described with reference to its use with the FLIR sensor system. The FLIR sensor comprises a plurality of detectors, 160 for the purpose of this discussion. The outputs of the 160 channels are multiplexed in the FLIR sensor prior to their application to the signal processor 20.

The multiplexed FLIR input signals are applied to the summing circuit 31. The output of the summing circuit 31 is processed by the automatic responsivity equalization circuitry 36. Gain factors are read from the non-volatile memory 39 into the RAM memory 35. The stored values are then multiplied by the gain factors and added to the FLIR analog signals in the summing circuit 31. In addition, DC restoration factors are determined and added to the FLIR signals in the summing circuit 31.

The output of the summing circuit 31 comprises signals which are DC restored and normalized relative to each other. These signals are then converted to digital data in the A to D converter 32 and stored in the scan converter 23. The scan converter operates in a manner which reformats and interpolates the digital data to adjust the number of scan lines to a number which is compatible with the video monitor. The output of the scan converter 22 is then applied to the output processor 23.

The output processor 23 utilizes the histogram generation circuitry 43 and the microprocessor 25 to generate a look-up table 46 in RAM memory which comprises a transfer function that enhances the digital video image being processed. The look-up table contains multiplicative factors which are applied to the digital video data in order to implement automatic gain control, automatic level correction, polarity reversal and gamma correction. The signals emerging from the look-up table 46 comprises enhanced digital video signals that are converted to analog video signals in the D to A converter 47 and applied to the aperture correction circuitry 49. The aperture correction circuitry 49 boosts the signal gain at predetermined frequencies. The aperture correction compensates for modulation transfer function roll-off caused by less than perfect optics, degraded video monitor resolution and detector sampling in the FLIR sensor.

Presented hereinvelow is a general description of a signal processor constructed in accordance with the principles of the present invention and employed as part of a forward looking infrared (FLIR) system. The signal processor will not be described with reference to any specific figure. The signal processor processes eight parallel channels comprising 20 multiplexed signals to implement image reformatting and video processing to convert 160 parallel infrared detector outputs into standard 525 line TV video output (480 lines of which are displayed).

The eight parallel multiplexed infrared video channel inputs comprise 20 detectors per channel. The input signals from each of the 20 channels are DC restored, responsivity corrected and digitized to a 9 bit intensity level in eight input processor circuits. The digital infrared video is reformatted by means of an orthogonal translation and stored in the memory of the scan converter. The image is stored in TV coordinates comprising 320 lines by 752 samples per line. The scan converter memory uses 64K RAM IC's and stores each field of the image in 36 IC's.

The stored image is read out four IR lines in parallel and interpolated to provide six TV lnes on the video monitor. The interpolated video is sampled in the histogram memory that stores the frequency of occurrence of each of the 512 (9 bit) intensity levels. The histogram is processed to provide automatic level and gain translation for the display video. The level and gain control functions are implemented in the RAM look-up table that translates each IR intensity level to a video monitor intensity level. Display gamma and image inversion correction factors are also stored in the look-up table. The output of the look-up table is converted to an analog signal, aperture corrected by means of the cosine filtering technique, and then applied to the video monitor for viewing.

The major functions that affect the video output are automatic responsivity equalization (ARE), DC restoration (DCR), interpolation, automatic level correction (ALC), automatic gain correction (AGC), gamma correction and aperture boost. The automatic responsivity equalization and DC restoration functions are accomplished in parallel on each of the eight multiplexed infrared video channels. ARE values are loaded into RAM memory from non-volatile memory at system turn-on. DC restoration is performed continuously to provide automatic compensation for the thermal environment of each detector in the infrared sensor.

Automatic responsivity equalization values are generated and updated by means of the calibration procedure. Both the DC restoration and responsivity equalization calibration are based on the detector array scanning a uniform thermal reference source during the inactive scan time (retrace). The dwell time on this source is relatively short (aproximately 300 microseconds) but provides enough samples (32) to correct for any DC droop and thermal change in the scene each scan field time.

In the normal operating mode, each analog infrared detector input signal to the signal processor is compensated by adding a DC restoration term and multiplying by a responsivity correction term to provide a voltage to the A to D converter. The equation defining this relationship is $$e_0 = (2.5 + e_1 - DCR)/(1 + ARE).$$

The 2.5 volt constant centers the output applied to the A to D converter.

The equation $$e_i = GK\ T + L,$$

where G is the channel gain, K is the responsivity factor,

T is the temperature difference seen by a detector and L is a level offset introduced by the electronics implies that, if ARE is set equal to $K-1$, then each detector output is normalized. These ARE values are computed in the initial calibration procedure and stored in non-volatile memory. Other relevant equations include:

$$ARE = K_i - 1,$$

$$DCR = V_0 GK\ T_{si} + L_i - V_{DCR}(1 + ARE),\ \text{and}$$

$$e_0 = V_{DCR} + G(T_{si} - T_i).$$

The DCR values are updated each scan field. When the detector array is scanned over the thermal reference source, the output of the A to D converter is compared with 1.5 volts that corresponds to an expected reference source temperature of 20° C. above ambient and a 0.075 V/°C. sensitivity. As each detector is multiplexed to the input processor, the corresponding DCR correction term is read out of memory and added to the detector voltage. The DCR term is also used to preset the up/down counter. The voltage comparator strobes the counter either up or down depending upon the input signal to the A to D converter.

If the FLIR detector input plus the old DCR correction term is low, then the counter is strobed to count up until the input plus the DCR correction is equal (normalized) to 1.5 volts. If the FLIR detector input plus the old term is high, then the counter is strobed to count down until the input is normalized. By providing several samples of the input to the counter, noise is averaged out to ±1 least significant bit (LSB) of the DCR term. The DCR correction is ±2 volts with 8 bit quantization thus providing DCR correction to ±16 millivolts or ±0.3 percent of the A to D converter input dynamic range. The new DCR correction is stored in memory and used to correct the next active field scan of the FLIR.

The initial calibration of the ARE values is performed during the calibration mode. In this mode, the scanning FLIR array looks at a uniform temperature target. The FLIR thus scans a uniform source temperature during the active field scan time and scans the thermal reference source during the inactive (retrace) portion of the field scan. With all the detectors looking at the same temperature difference between the active field-of-view and the thermal reference, the only differences in output signal are caused by responsivity differences between detectors.

Initially the ARE values are set to zero, and the DCR offsets required for a uniform output are generated. The average calibration scene temperature is then computed from eight successive histograms. This average scene temperature is used as the comparator reference voltage to determine ARE values. This self adaptive comparator reference allows calibration of the detector array with different calibration scene input, such as sky, ground or test target, and the like. The ARE values are generated in a manner similar to the DCR terms by using the comparator to strobe the up/down counter to correct the ARE value. The generation of ARE and DCR values is an iterative process. The new ARE values shift the DCR values, which in turn adjusts the ARE values. This process in convergent, and after several fields, the ARE and DCR terms are stable.

To further reduce the noise sensitivity of the ARE terms, the actual stored ARE values represent the average of 32 consecutive ARE corrections. Since the DCR and ARE calibration is a closed loop system around the A to D converter, any channel-to-channel processing differences are also compensated for automatically by providing the same digital output for every detector for the same delta temperature input. The ARE compensation provides a range of a $1 \pm 0.5$ multiplication factor with 8 bit quantization for an accuracy of $\pm 0.21$ percent at the A to D converter input.

Interpolation of the IR scan lines to TV lines is required to map 320 IR lines to a 525 line TV display, 480 of which are used. The interpolation algorithm maps four successive IR scan lines onto six TV lines. The interpolation is performed on an IR/TV field basis to eliminate image break-up that would result if the entire IR/TV frame (two fields) were interpolated. This single field interpolation, while eliminating image break-up caused by image or sensor motion, does introduce some resolution degradation in the vertical dimension. However, in the dynamic scene environment of low-altitude flight, for example, the resultant image quality is better with this form of field interpolation.

Automatic gain and level adjustment is provided by collecting a histogram of the scene intensities, determining both the minimum and maximum intensities from a 7.5 by 10 degree window in the lower center of the field of view, or from the total scene. The field of view is selected through the use of gating circuitry. The gain and level are then adjusted to display only the video intensities representing terrain features.

The software algorithm implemented in the microprocessor acts as a low pass filter with respect to the frame-to-frame maximums and minimums using the following relationship:

$$M_i = K(I - M_{i-1}) + M_{i-1}$$

where I is the detected maximum or minimum, M is the maximum or minimum used for subsequent computation, M is the maximum or minimum from the previous frame and K is a weighting factor.

Using the maximum and minimum values, after filtering, the gain and level values may be computed from the following equations:

$$G = 2^N / (Max - Min)$$

$$L = (Max + Min)/2$$

where G is the gain, L is the level and N is the number of bits for full display dynamic range.

The output transformation may be computed from the following equations:

$$X(I) = G(I - L) + (2^N/2 - 1)$$

$$X(I) < 0, X(I) = 0$$

$$X(I) > 2^N - 1, X(I) = 2^N - 1$$

where X(I) is the output value for input I, I is the input for 0 to $2^M - 1$, and M is the number of input bits.

The digital video from the interpolator is gated to the histogram memory. Either the total field of view or the small window is sampled on alternate TV fields. Each intensity level increases the count stored in memory for the particular intensity. At the end of one IR field time, the histogram is read out of the microprocessor to enable computation of the gain and level adjustments. The microprocessor also performs a low pass filter operation to integrate several frames of data. Then, the gain and level settings are calculated from the filtered data.

The gain and level transfer function is provided in the look-up table which is loaded in RAM by the microprocessor. The look-up table is used to convert each 9 bit digital FLIR intensity to an 8 it display video intensity. The required gamma correction factors for the display and image polarity factors are also stored in the look-up table. Aperture boost is provided after D to A conversion of the video signals to compensate for MTF rolloff caused by optics, display resolution and detector sampling. The aperture correction provides a boost of 6 dB at the Nyquist sampling frequency (0.54 cycle/m-rad, T = 0.66 microseconds).

Thus, there has been described a new and useful signal processor which may be employed to provide electronically-enhanced video imagery. Software-controlled digital image enhancement features of the present invention may be implemented using a relatively small amount of standard integrated circuits. The system provides for adaptive calibration and the calibration factors are stored indefinitely for use by the system. The temperature of the reference temperature source used to calibrate the system need not be known for the system to operate properly. The DC levels of all detectors in the system are restored automatically to the DC reference temperature defined by the reference temperature source. There are no manual adjustments to be made during calibration or operation.

Image enhancement functions are provided in a look-up table instead of being calculated by means of analog circuits as in conventional signal processors. A wide dynamic range is achieved using digital image-processing circuitry and techniques. Increased system frequency response is achieved by means of the aperture correction circuitry. Flexibility and growth of the system is possible and may be implemented by means of changes to software programs.

It is to be understood that the above-described embodiment is merely illustrative of one of the many specific embodiments which represent applications of the principles of the present invention. Clearly, numerous and varied other arrangements may be devised by those skilled in the art without departing from the spirit and scope of the invention.

What is claimed is:

1. A signal processor for use with an imaging sensor system that comprises a plurality of detectors which are scanned across an image scene during a first portion of a scan cycle and scanned across a reference temperature source during a second portion of said scan cycle, said signal processor providing video output signals to a video monitor which are representative of said image scene, said signal processor comprising:

input processor means coupled to said imaging sensor system for processing analog signals derived from each of said plurality of detectors in order to equalize the gains of said analog signals relative to one another another during said first portion of said scan cycle based upon stored gain correction signals derived from a predetermined sensor responsivity calibration procedure, for processing said analog signals in order to restore the DC levels of signals derived from each of said detectors to DC values related to said reference temperature source during said second portion of said scan cycle, and for processing the equalized and DC restored signals to provide digitized first output signals from said input processor means, said input processor means including means for generating automatic responsivity equalization factors and DC restoration values including circuit means for correcting errors in said equalization factors resulting from adjustment of said restoration values and for correcting errors in said restoration values resulting from adjustment of said equalization factors;

scan converter means coupled to said input processor means for storing digitized first output signals and processing the stored digitized signals to provide digitized second output signals which are compatible with said video monitor; and output processor means coupled to said scan converter means for processing said second digitized output signals in a manner which permits software-controlled digitized image enhancement thereof, and for converting the enhanced second digitized output signals into analog video signals compatible with said video monitor.

2. The signal processor of claim 1 wherein said input processor means comprises:

analog to digital conversion means for converting applied analog signals into said digitized first output signals;

summing means for combining said analog signals, said DC restoration signals and said gain correction signals and applying the combined signals to said analog to digital converter; and computer processor means coupled to said analog to digital conversion means and said summing means for computing said DC level correction signals and for controlling combining of the analog signals, gain correction signals and DC level correction signals in a predetermined manner to provide signals which are digitized by said analog to digital conversion means.

3. The signal processor of claim 2 wherein said computer processor means comprises:

a non-volatile memory for storing gain correction constants derived from said calibration procedure;

first memory means coupled to said summing means for storing said DC restoration signals prior to their application to said summing means;

second memory means coupled to said summing means for storing said gain correction signals prior to their application to said summing means;

a computer processor coupled to said non-volatile memory, said first and second memory means and said analog to digital converter for computing said DC restoration signals and storing them in said first memory means, for loading said gain correction signals from said non-volatile memory into said second memory means, and for controlling the processing of said analog signals, and said gain correction signals in order to combine said signals in said analog to digital converter.

4. The signal processor of claim 3 wherein said first memory means comprises:

a clamping voltage reference circuit coupled to said analog to digital converter for processing output signals derived therefrom in order to provide fixed voltage reference signals for the computation of said DC restoration signals; and a counter circuit for processing to said voltage reference signals in order to provide incrementing and decrementing signals to said first memory means which adjust and normalize said DC restoration signals relative to said fixed voltage reference during each scan cycle.

5. The signal processor of claim 4 wherein said first and second memory means further comprise:

first and second random access memories;

first and second digital to analog converters coupled between said first and second random access memories, respectively, for converting digital signals stored in said memories into analog signals compatible with said analog to digital converter.

6. The signal processor of claims 1, 2, 3, 4, or 5 wherein said scan conversion means comprises:

a scan converter for storing said digitized first output signals; and interpolation means coupled to said scan converter for converting the digitized first output signals into said digitized second output signals which are compatible with said video monitor.

7. The signal processor of claim 6 wherein said output processor means comprises:

look-up table generation means for computing and storing a look-up table comprising image enhancement correction signals;

digital to analog conversion means coupled to said look-up table generation means for converting signals received from said scan converter means into analog video output signals compatible with said video monitor;

aperture correction means coupled to said digital to analog converter for processing the enhanced signals derived from said look-up table generation means in order to enhance the modulation transfer function of said system; and computer processor means coupled to said look-up table generation means for computing the signals comprising said look-up table.

8. The signal processor of claim 7 wherein said look-up table generation means comprises:

histogram generation means for generating a histogram of the number of occurrences of said first output signals at each intensity level associated with said sensor;

a look-up table memory for storing said image enhancement signals;

said computer processor means computing said image enhancement correction signals utilizing said histogram and storing said computed signals in said look-up table memory.

9. A signal processor for use with an imaging sensor system that comprises a plurality of detectors which are scanned across an image scene during a first portion of a scan cycle and scanned across a reference temperature source during a second portion of said scan cycle, said signal processor providing video output signals to a video monitor which are representative of said image scene, said signal processor comprising:

input processor means coupled to said imaging sensor system for processing analog signals derived from each of said plurality of detectors in order to equalize the gains of said analog signals relative to one another during said first portion of said scan cycle based upon stored gain correction signals derived from a predetermined sensor responsivity calibration procedure, for processing said analog signals in order to restore the DC levels of signals derived from each of said detectors to DC values related to said reference temperature source during said second portion of said scan cycle, and for processing the equalized and DC restored signals to provide digitized first output signals from said input processor means, said input processor means including means for generating automatic responsivity equalization factors and DC restoration values including circuit means for correcting errors in said equalization factors resulting from adjustment of said restoration values, and for correcting errors in said restoration values resulting from adjustment of said equalization factors.

10. A signal processor for use with an imaging sensor system that comprises a plurality of detectors which are scanned across an image scene during a first portion of a scan cycle and scanned across a reference temperature source during a second portion of said scan cycle, said signal processor providing video output signals to a video monitor which are representative of said image scene, said signal processor comprising:

input processor means coupled to said imaging sensor system for processing analog signals derived from each of said plurality of detectors in order to equalize the gains of said analog signals relative to one another during said first portion of said scan cycle based upon stored gain correction signals derived from a predetermined sensor responsivity calibration procedure, for processing said analog signals in order to restore the DC levels of signals derived from each of said detectors to DC values related to said reference temperature source during said second portion of said scan cycle, and for processing the equalized and DC restored signals to provide digitized first output signals from said input processor means, said input processor means including means for generating automatic responsivity equalization factors and DC restoration values including circuit means for correcting errors in said equalization factors resulting from adjustment of said restoration values, and for correcting errors in said restoration values resulting from adjustment of said equalization factors; and means for converting and processing said digitized first output signals from input processor means into analog video output signals compatible with said video monitor.

11. A signal processor for use with an imaging sensor system that comprises a plurality of detectors which are scanned across an image scene during a first portion of a scan cycle and scanned across a reference temperature source during a second portion of said scan cycle, said signal processor providing video output signals to a video monitor which are representative of said image scene, said signal processor comprising:

input processor means coupled to said imaging sensor system for processing analog signals derived from each of said plurality of detectors in order to equalize gains of said analog signals relative to one another during said first portion of said scan cycle based upon stored gain correction signals derived from a predetermined sensor responsivity calibration procedure, for processing said analog signals in order to restore the DC levels of signals derived from each of said detectors to DC values related to said reference temperature source during said second portion of said scan cycle, and for processing the equalized and DC restored signals to provide digitized first output signals from said input processor means, said input processor means including means for generating accurate automatic responsivity equalization factors and accurate DC restoration values including means for substantially eliminating offsets in restoration values resulting from adjustment of equalization factors, and viceversa; and means for converting and processing said digitized first output signals from said input processor means into analog video output signals compatible with said video monitor.

* * * * *